US012490790B2

(12) United States Patent
Michaeloff

(10) Patent No.: US 12,490,790 B2
(45) Date of Patent: Dec. 9, 2025

(54) BEVERAGE POCKET OF AN APPAREL ARTICLE

(71) Applicant: Wilson Sporting Goods Co., Chicago, IL (US)

(72) Inventor: Joelle Michaeloff, Philadelphia, PA (US)

(73) Assignee: Wilson Sporting Goods Co., Chicago, IL (US)

( * ) Notice: Subject to any disclaimer, the term of this patent is extended or adjusted under 35 U.S.C. 154(b) by 311 days.

(21) Appl. No.: 17/096,307

(22) Filed: Nov. 12, 2020

(65) Prior Publication Data

US 2022/0142277 A1 May 12, 2022

(51) Int. Cl.
*A41D 27/20* (2006.01)
*A41D 1/06* (2006.01)
*B67B 7/16* (2006.01)

(52) U.S. Cl.
CPC ............. *A41D 27/201* (2013.01); *A41D 1/06* (2013.01); *B67B 7/16* (2013.01); *A41D 2300/30* (2013.01); *A41D 2400/46* (2013.01)

(58) Field of Classification Search
CPC .. A41D 2400/46; A41D 13/0012; A41D 1/06; A41D 27/20; A41D 27/205; A41D 27/204; A41D 27/207; A41D 27/22; A41D 1/215
See application file for complete search history.

(56) References Cited

U.S. PATENT DOCUMENTS 153,292 A * 7/1874 Woodward ............. A41D 13/02 2/79
762,363 A * 6/1904 Talcott .................... A41D 13/02 2/79
780,720 A * 1/1905 Keeley .................... A41D 27/20 2/250
893,403 A * 7/1908 Van Pelt ................ A41D 27/20 2/250
1,649,932 A * 11/1927 Sweet ..................... A41D 27/20 2/250
1,726,951 A * 9/1929 Evanove ................ A41D 13/02 D2/743
1,778,057 A * 10/1930 Ballentine .............. A41D 27/20 2/250

(Continued)

FOREIGN PATENT DOCUMENTS

CN 202750735 U * 2/2013 ............... A41D 1/06

OTHER PUBLICATIONS

Translation of CN-202750735-U (Year: 2013).*

*Primary Examiner* — Khoa D Huynh
*Assistant Examiner* — Grady Alexander Nunnery
(74) *Attorney, Agent, or Firm* — Terence P. OBrien

(57) ABSTRACT

A garment configured for retaining a beverage container and for use on the lower body of a user. The garment includes a pocket coupled to the garment, and a tab coupled to the garment at first and second locations. The pocket includes a lower closed edge, first and second closed side edges and an open upper edge. The pocket is sized to removably receive and retain the beverage container. The first and second locations are spaced apart from each other to define an unattached region of the tab between the first and second locations. The unattached region configured for facilitating the opening of the beverage container by the user.

3 Claims, 9 Drawing Sheets

(56) References Cited

U.S. PATENT DOCUMENTS 2,810,132 A * 10/1957 Nicholson ................. A45F 5/00 2/253
3,276,040 A * 10/1966 Belzer .................... A41D 27/20 2/250
5,337,934 A * 8/1994 Johnson .................... A45F 3/04 224/582
6,311,335 B1 * 11/2001 Uchida ................ A41D 27/205 2/250
6,626,733 B1 * 9/2003 Knutson ............ A41D 13/0012 224/148.1
6,859,943 B1 3/2005 Wallace, III
D570,577 S 6/2008 Keppler
7,484,249 B1 * 2/2009 Reese .................... A41D 27/20 2/48
D627,540 S 11/2010 Claeys
8,756,717 B2 6/2014 Claeys
9,009,864 B1 * 4/2015 Loveday ............ A41D 13/0012 2/69
9,192,223 B2 11/2015 Loveday
9,445,637 B2 9/2016 Buczkowski et al.
D843,085 S 3/2019 Cole
2002/0069450 A1 * 6/2002 McNamara ............ A41D 27/08 2/244
2007/0050891 A1 * 3/2007 Heatherly ................. B67B 7/18 2/244
2007/0083984 A1 * 4/2007 Wagenknecht .......... A41D 1/08 2/227
2009/0199325 A1 * 8/2009 Fuwausa ................ A41D 27/08 2/244
2011/0214214 A1 * 9/2011 Seguin ................... A41D 27/20 2/253
2013/0212788 A1 * 8/2013 Curtis ................ A41D 13/0012 2/455
2015/0296903 A1 * 10/2015 Hamasaki, Jr. ...... A41D 19/015 2/16
2016/0235141 A1 * 8/2016 Hollifield ............. A41D 25/003
2016/0270465 A1 9/2016 Lamprey
2016/0324224 A1 * 11/2016 Van Wierts .............. A41D 1/06
2017/0265543 A1 * 9/2017 Allouche ............. A41D 27/201
2018/0168250 A1 * 6/2018 Ly ........................ A41D 15/002
2020/0308748 A1 * 10/2020 Fanesi ................ D06B 11/0089

* cited by examiner

FIG. 15
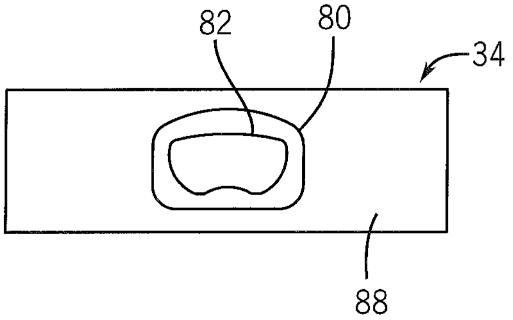
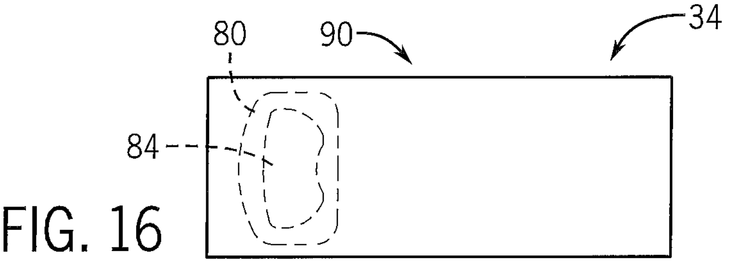
FIG. 16
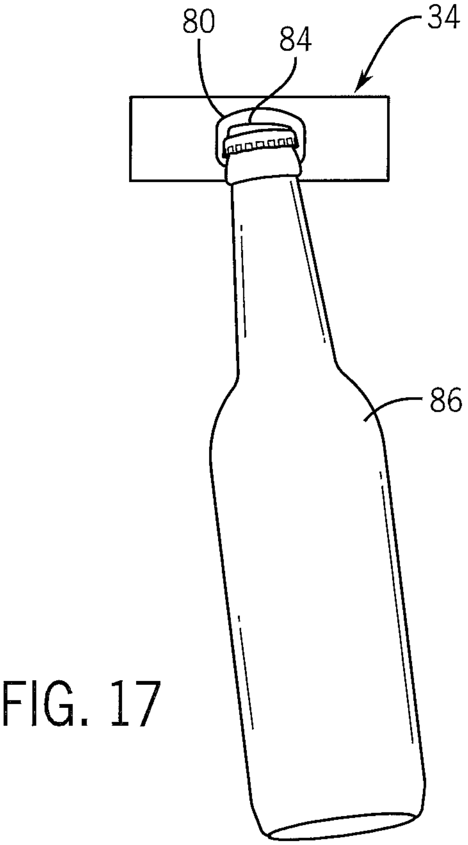
FIG. 17

BEVERAGE POCKET OF AN APPAREL ARTICLE

FIELD OF THE INVENTION

The present invention relates to an improved garment having pocket configured for removably retaining a beverage container and a tab configured for facilitating the retention, and/or opening, of the beverage container.

BACKGROUND OF THE INVENTION

Articles of clothing or garments are generally not configured for holding a beverage container. Accordingly, when attending a social event, such as an outdoor social event where beverages are served, a person cannot utilize a garment for retaining the beverage container and must hold the beverage either in the person's hand or on a stationary object, such as a table or a bar. In crowded social settings, one can easily misplace or lose their beverage container if they place it on a table or bar. Further, if the person is in a setting where he or she is moving about, leaving a beverage container on a fixed table or bar is problematic because the beverage is not always available when desired and the beverage container can be easily mis-placed, discarded or knocked over.

During many social events, it is common for people to enjoy bottle beverages. Many bottled beverages are secured with metal bottle caps that are pleated or ruffled around the upper rim of the bottle. Many such bottled beverages having twist-off caps that many people find difficult or uncomfortable to remove with their bare hands. Other bottled beverages include caps that require a bottle opener or other tool to remove the cap from the bottle. Bottle opening tools are small devices that are easily misplaced, lost or forgotten. Accordingly, on many occasions, people engaging in such social events can find themselves without a tool for removing caps from the bottles of beverages.

Accordingly, a need exists for an improved garment that is configured for retaining a beverage particularly in social settings. What is needed is a convenient way for participants in social events to enjoy bottled beverages by being able to easily, quickly and comfortably remove the caps from such bottled beverages. It would be advantageous to provide a mechanism for ensuring that a social event can be held with refreshments without the participant having to continuously hand carry or monitor the location of his or her drink when enjoying a social event. It would also be advantageous to provide a garment configured for retaining a beverage container that retains a stylish, pleasing aesthetic

SUMMARY OF THE INVENTION

The present invention presents a garment configured for retaining a beverage container and for use on the lower body of a user. The garment includes a pocket coupled to the garment, and a tab coupled to the garment at first and second locations. The pocket includes a lower closed edge, first and second closed side edges and an open upper edge. The pocket is sized to removably receive and retain the beverage container. The first and second locations are spaced apart from each other to define an unattached region of the tab between the first and second locations. The unattached region configured for facilitating the opening of the beverage container by the user.

This invention will become more fully understood from the following detailed description, taken in conjunction with the accompanying drawings described herein below, and wherein like reference numerals refer to like parts.

BRIEF DESCRIPTION OF THE DRAWINGS

FIG. 15 is a front view of a tab in accordance with another alternative implementation of the present invention.

FIG. 16 is a front view of a tab in accordance with another alternative implementation of the present invention.

FIG. 17 is a front view of the tab of FIG. 15 illustrating a cap of a bottle being removed by a user using the tab.

Figure 1:
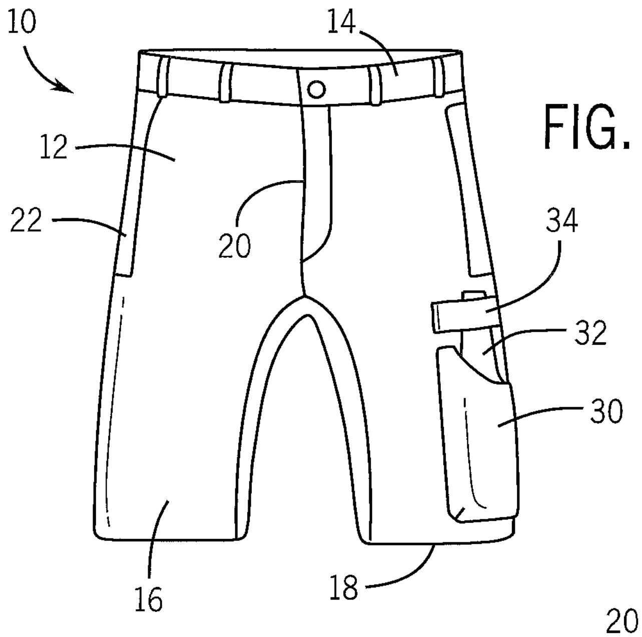
FIG. 1 is a front view of a pair of shorts carrying a beverage container in accordance with one implementation of the present invention.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF THE INVENTION

Figure 2:
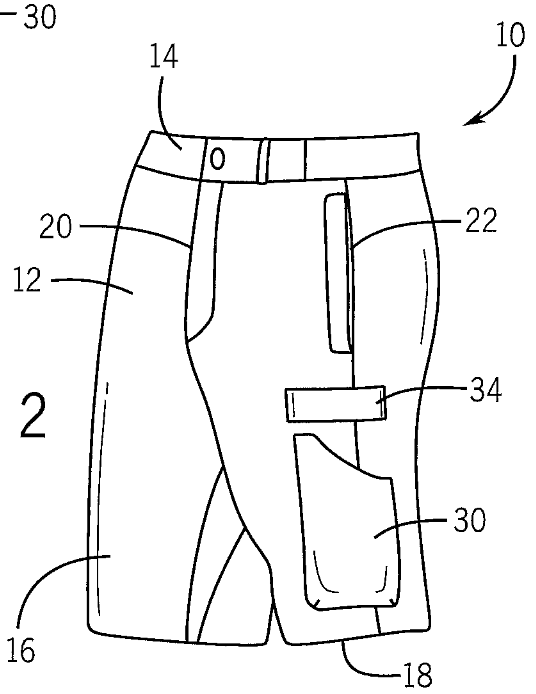
FIG. 2 is a front side view of the pair of shorts of FIG. 1 shown without the beverage container.
Figure 3:
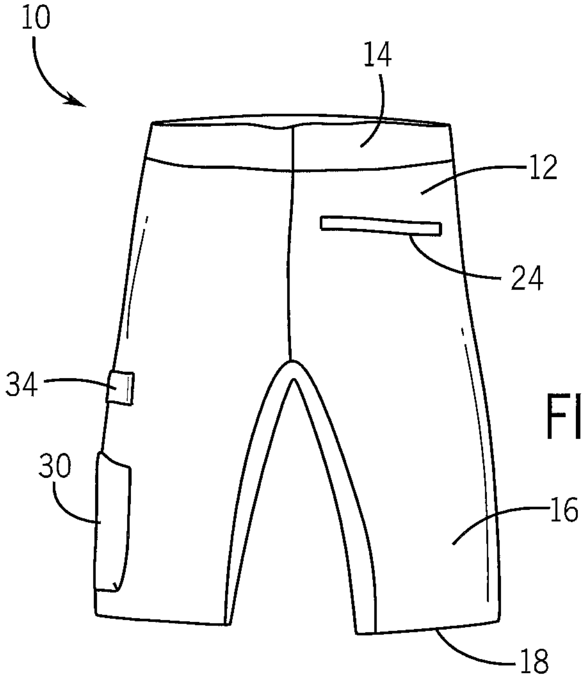
FIG. 3 is a rear view of the pair of shorts of FIG. 1 shown without the beverage container.
Figure 10:
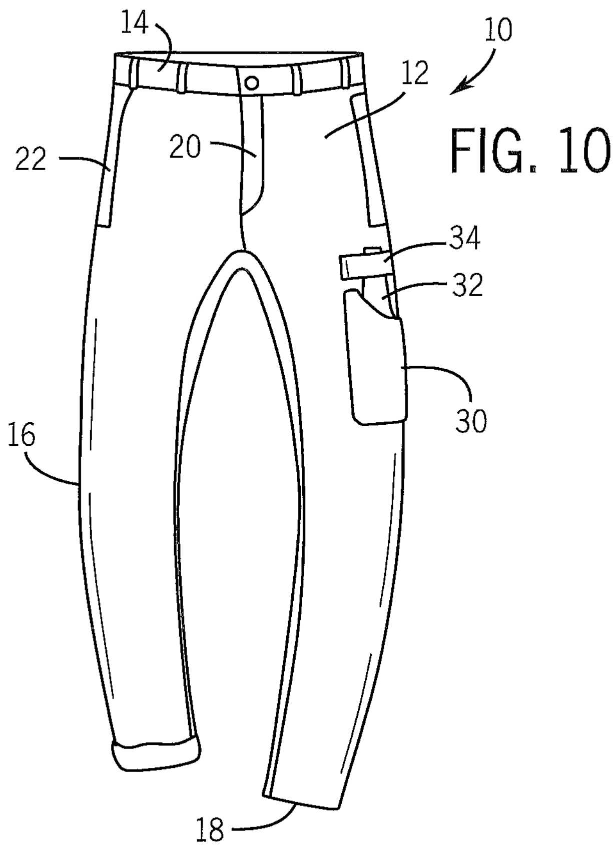
FIG. 10 is a front view of a pair of pants carrying a beverage container in accordance with an alternative implementation of the present invention.

Referring to FIGS. 1 through 3, a garment for use on a lower body of a user is generally indicated as item 10. The garment 10 of FIG. 1 is configured as a pair of shorts. The garment 10 of FIG. 10 is configured as a pair of pants. The invention can also be directly applicable to other garments such as, for example, skirts, jackets, hoodies, shirts, jerseys, sweaters, and coats. The garment 10 includes a waist region 12, a waistband 14, a pair of legs 16 defining a pair of leg openings 18, a zip fly 20, a pair of front pockets 22 and a rear pocket 24. In other implementations, the garment can include other combinations of pockets, zippers, waist bands and other features. In other implementations, the garment may be formed without one or more of the front pockets, the rear pocket and/or the zip fly.

The garment 10 can be an outer garment configured for use in all types of weather, for all forms of outdoor activity, and for wear individually or with one or more other garments. Alternatively, the garment 10 can be configured for casual wear or other purposes. The garment 10 can be constructed of a variety of materials to provide one or more of the following characteristics wind-resistance, moisture resistance, insulation, durability, wear-resistance, debris-resistance, flexibility, breathability, resiliency, comfort and style. Examples of materials that can be used for the garment include woven and unwoven fabrics, knits or textiles, nylon, cotton, other synthetic or natural materials, elastic materials, inelastic materials, hydrophobic materials, water resistant materials, such as Goretex, rubber, wool, cotton, leather, synthetic leather, polyester, elastane, an elastic fabric material, natural fibers, synthetic fibers, para-aramid synthetic fibers such as Kevlar®, canvas, nylon, other polymeric materials and combinations thereof.

Figure 4:
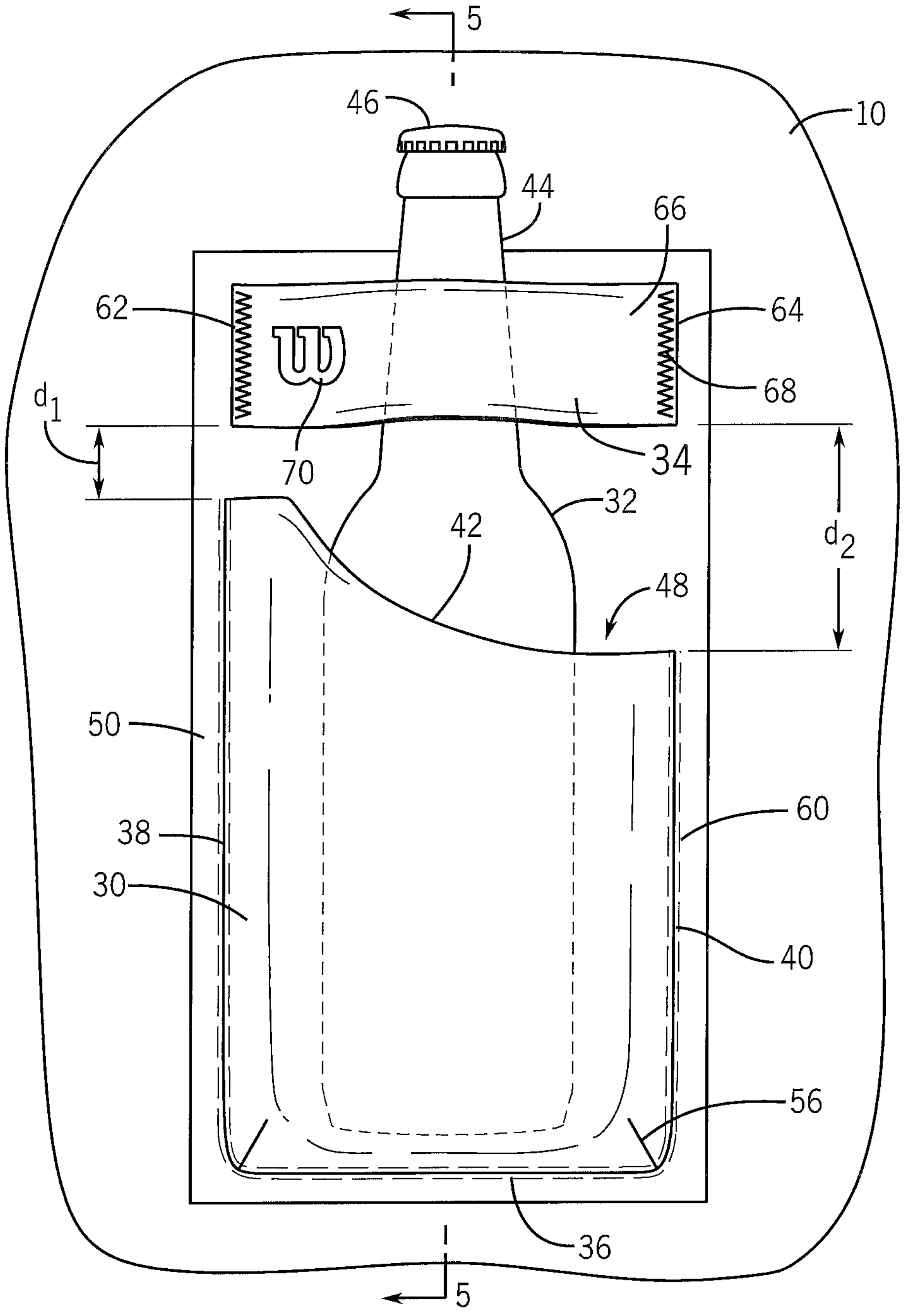
FIG. 4 is a side view of a portion of the pair of shorts of FIG. 1 including a pocket and a tab.

As illustrated in FIGS. 1 and 4, the garment 10 includes a beverage container pocket 30 containing a bottle 32 and a tab 34 positioned above the pocket 30. The pocket 30 is coupled to the garment 10. In one implementation, the pocket 30 can be stitched to the garment 10. In other implementations, the pocket 30 can be coupled to the garment through adhesives, buttons, zippers, rivets, buckles, clamps, lacing, stitching or combinations thereof. For purposes of this disclosure, the term "coupled" means directly or indirectly connected. For example, a handle portion can be integrally formed to a barrel portion, or the handle portion can be separated from the barrel portion by one or more intermediate components. In each example, the handle portion is coupled to the barrel. In the context of railroad cars, a caboose of a train can be directly connected to an engine of the train. Alternatively, one or more railroad cars can be positioned between the engine and the caboose. In each case, whether directly connected or separated by one or more railroad cars, the caboose is coupled to the engine.

The pocket 30 can include a lower edge 36, first and second side edges 38 and 40, and an upper edge 42. The pocket 30 is sized to removably receive and retain the beverage container 32. The beverage container 32 is shown as a bottle having a neck 44 and a cap 46. In other implementations, the beverage container can be a beverage can or a bottle of a different shape. The lower edge 36 and the first and second side edges 38 and 40 are illustrated as being substantially linear. In other implementations, the lower closed edge 36 and the first and second closed side edges 38 and 40 can be curved, can define an irregular path, or can take a path that is a combination of one or more linear and/or curved portions. The first and second side edges 38 and 40 can be parallel to each other. In other implementations, some or all of the first and second side edges 38 and 40 can be non-parallel to each other.

In one implementation, the lower edge 36 and the first and second side edges 38 and 40 are closed. In other implementations, one or more portions of one or more of the lower edge 36 and/or the first and second side edges 38 can be open. For example, each of the lower edge 36 and the first and second side edges 38 can be closed or attached to the garment 10 via stitching or other means over 30 to 90 percent of the length of the lower edge 36 and the first and second side edges 38 and 40, and the remaining 10 to 70 percent of the length can be unattached to the garment 10.

The upper edge 42 extends from the top of the first side edge 38 to the top of the second side edge 40 of the pocket 30. In one implementation, the upper edge 42 is open and unattached to the garment 10 between the first and second side edges 38 and 40. In other implementations, one or more portions of the upper edge 42 can be closed via stitching or other coupling means to the garment 10 and the remaining portions of the upper edge 42 can be open. The upper edge 42 in combination with the garment 10 defines a beverage opening 48 for removably receiving the beverage container 32. Referring to FIGS. 1, 2 and 4, the curved upper edge 42 of the pocket 30 facilitates the insertion and removal of the beverage container 32 from the pocket 30.

The pocket 30 can include one or more gussets 56, darts, stitchings or other structure to form the shape of the pocket 30. In one implementation, the pocket 30 has a width within the range of 6 to 20 centimeters, and a height measured from the lower edge 36 to the end of the first or second side edges 38 and 40 within the range of 6 to 30 centimeters. In another implementation, the pocket can a have a width within the range of 10 to 16 centimeters, and a height within the range of 10 to 22 centimeters. In one implementation, the height of the pocket 30 measured from the lower edge 36 to the top end of the first side edge 38 can be different than the height of the pocket 30 measured form the lower edge 36 to the top end of the second side edge 40. In such implementations, the upper edge 42 extends in a direction that is non-parallel to the waistband 14 of the garment 10. The upper edge 42 can extend between the first and second side edges 38 and 40 in a manner that is linear, non-linear, curved, irregular or combinations thereof.

Referring to FIGS. 4, 5 and 7A, 7B and 7C, the pocket 30 can be formed of one or more materials to provide one or more of the following characteristics wind-resistance, moisture resistance, insulation, durability, wear-resistance, debris-resistance, flexibility, breathability, resiliency, comfort and style. Examples of materials that can be used for the garment include woven and unwoven fabrics, knits or textiles, nylon, cotton, other synthetic or natural materials, elastic materials, inelastic materials, hydrophobic materials, insulating materials, such as Neoprene, rubber, wool, cotton, leather, synthetic leather, polyester, elastane, natural fibers, synthetic fibers, para-aramid synthetic fibers such as Kevlar®, canvas, nylon, other polymeric materials and combinations thereof. In one implementation, the pocket 30 includes elastane or other form of elastic material to enable the pocket 30 to stretch and expand to readily receive the beverage container 32 and then return to a generally flat state when the beverage container 32 is removed from the pocket 30.

Figure 5:
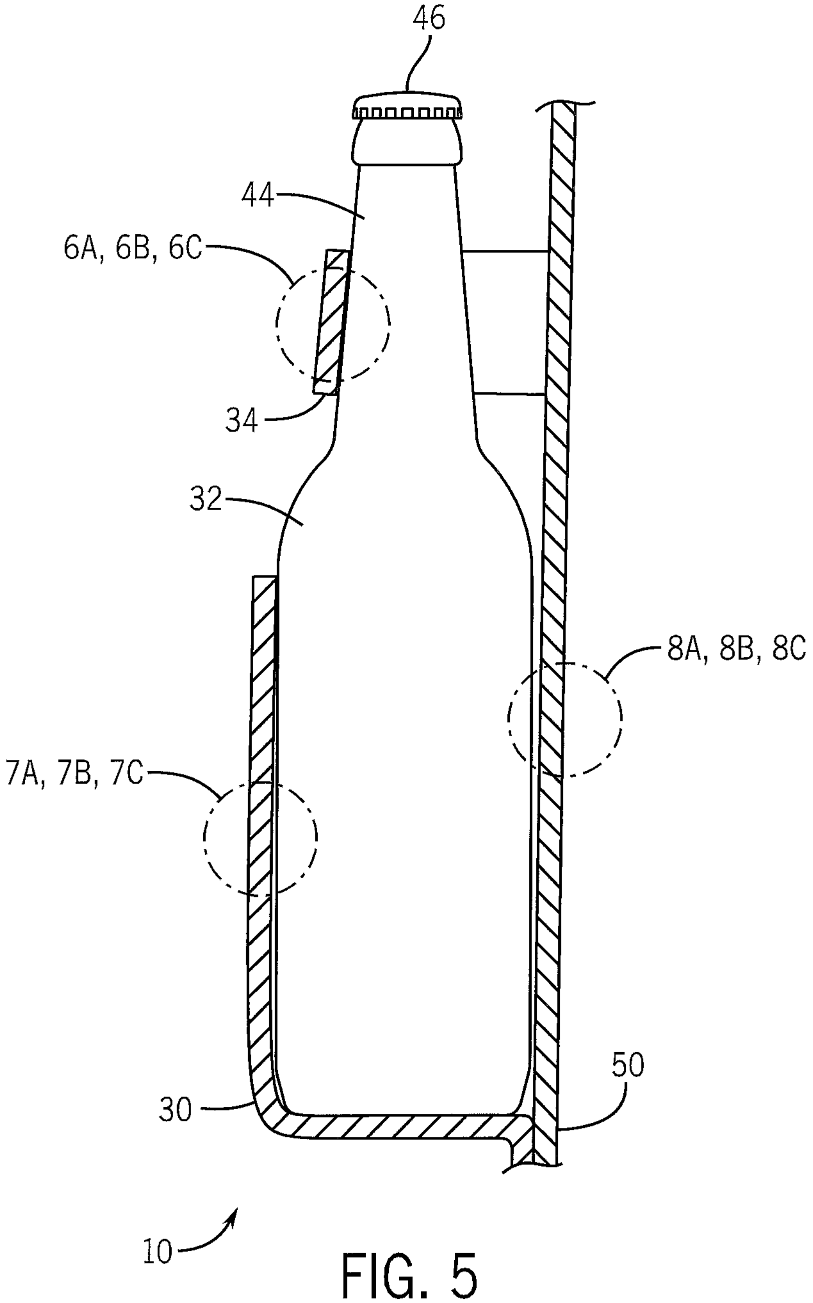
FIG. 5 is cross-section view of the portion of the pair of shorts taken along line 5-5 of FIG. 4.
Figure 6A:
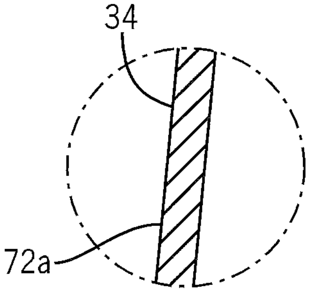
FIGS. 6A, 6B and 6C are enlarged cross-sectional views of the tab taken from circle 6A, 6B, 6C of FIG. 5.
Figure 6B:
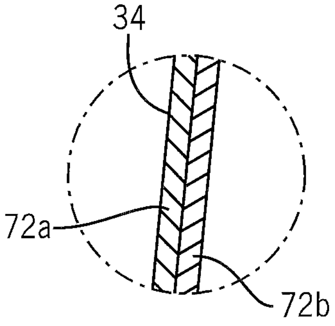
Figure 6C:
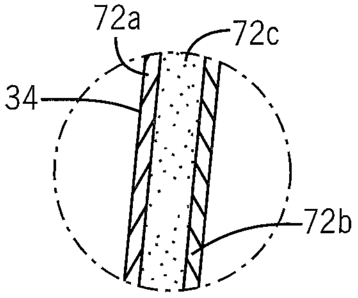
Figure 7A:
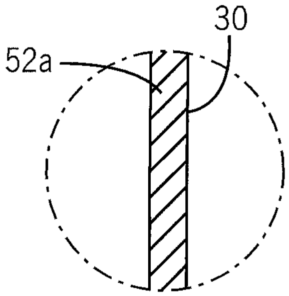
FIGS. 7A, 7B and 7C are enlarged cross-sectional views of the pocket taken from circle 7A, 7B, 7C of FIG. 5.
Figure 7B:
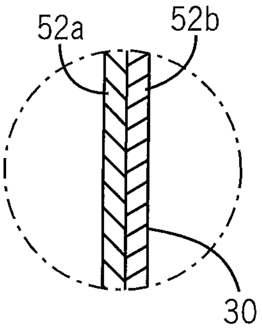
Figure 7C:
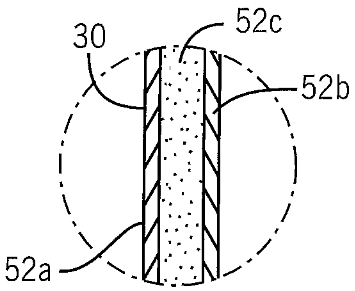

Referring to FIGS. 5 and 7A, in one implementation, the pocket 30 can be formed of a single layer **52*a* of material. The single layer 52*a* of material may also include a finish, one or more coatings and/or other treatments, such as a durable water repellant coating. Referring to FIGS. 5 and 7B, in other implementations, the pocket 30 can be formed of two layers 52*a* and 52*b* of material, wherein one layer can provide one or more features and the other layer may provide one or more different features. For example, layer 52*b* may be waterproof or have moisture resistance properties. Referring to FIGS. 5 and 7C, in other implementations, the pocket 30 may be formed of at least three layers 52*a*, 52*b* and 52*c* of material. The three layers 52*a*, 52*b* and 52*c* can be formed of different materials having different properties or features. For example, layer 52c may be formed of an insulating material. In other implementations, the three layers 52a, 52b and 52**c can be formed of any combination of one or more different materials having one or more different properties. In other implementations, other numbers of layers can be employed, such as four or more layers of material.

Figure 8A:
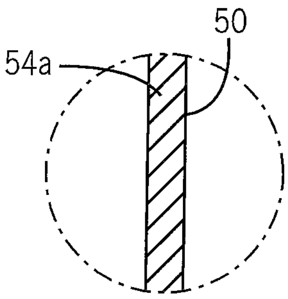
FIGS. 8A, 8B and 8C are enlarged cross-sectional views of the pair of shorts taken from circle 8A, 8B, 8C of FIG. 5.
Figure 8B:
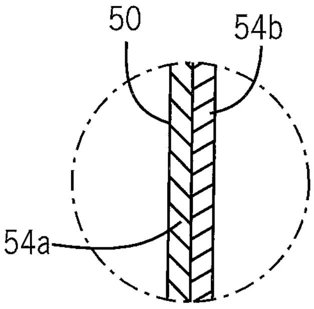
Figure 8C:
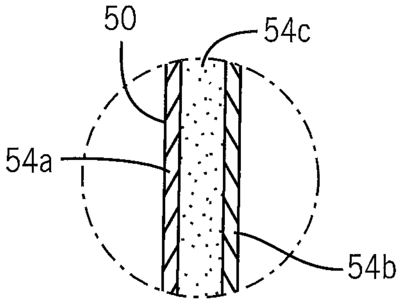

Referring to FIGS. 4, 5, and 8A, 8B and 8C, the pocket 30 is coupled to the garment 10. In another implementation, the garment 10 can include a beverage pocket region 50. The beverage pocket region 50 is shown in one example size. In other implementations, the beverage pocket region can have other shapes or sizes. For example, the beverage pocket region can be sized and shaped to match the size of the pocket. Referring to FIGS. 5 and 8A, in one implementation, the beverage pocket region 50 can be formed of a single layer 54a of material. The single layer 54a of material may also include a finish, one or more coatings and/or other treatments. The single layer 54a can be a different material than the adjacent regions of the garment 10. In another implementations, the single layer 54a of the beverage pocket region 50 can be formed of the same material as the adjacent regions of the garment 10. In another implementation, the single layer 54a of the beverage pocket region 50 can be formed of a thicker layer of material than the adjacent regions of the garment 10. Referring to FIGS. 5 and 8B, in other implementations, the beverage pocket region 50 can be formed of two layers 54a and 54b of material, wherein one layer can provide one or more features and the other layer may provide one or more different features. For example, layer 54a may be waterproof or have moisture resistance properties. Referring to FIGS. 5 and 8C, in other implementations, the beverage pocket region 50 may be formed of at least three layers 54a, 54b and 54c of material. The three layers 54a, 54b and 54c can be formed of different materials having different properties or features. For example, layer 54c may be formed of an insulating material. In other implementations, the three layers 54a, 54b and 54c can be formed of any combination of one or more different materials having one or more different properties. In other implementations, other numbers of layers can be employed, such as four or more layers of material can be used to form the beverage pocket region 50.

In one implementation, the pocket 30 is directly stitched to the garment 10 with a stitching 60. In another implementation, the garment 10 includes the beverage pocket region 50 and the pocket is directly stitched with the stitching 60 to the beverage pocket region 50. In another implementation, the stitching 60 of the lower edge 36 and the first and second side edges 38 and 40 to the garment 10 itself or to the garment 10 having the beverage pocket region 50 can be a reinforced stitching. The reinforced stitching 60 can include a backing fabric to prevent ripping or tearing of the garment 10 and the pocket 30.

Referring to FIGS. 1 through 4, the tab 34 is coupled to the garment 10 at first and second locations 62 and 64. The first and second locations 62 and 64 are spaced apart from each other to define an unattached region 66 of the tab 34 between the first and second locations 62 and 64. In one implementation, the tab 34 is attached to the garment only at the first and second locations 62 and 64, and no other location of the tab 34 is connected to the garment 10. In one implementation, the tab 34 can be stitched to the garment 10 through a plurality of tab stitchings 68. In another implementation, tab 34 can be pivotally coupled to the garment 10, such as, for example, through use of a rivet. In other implementations, the tab 34 can be coupled to the garment through adhesives, buttons, zippers, clamps, rivets, snaps, buckles, lacing, hook and loop fasteners, stitching or combinations thereof. In one implementation, the tab 34 has a width within the range of 6 to 20 centimeters, and a height within the range of 1 to 6 centimeters. In another implementation, the pocket can a have a width within the range of 10 to 14 centimeters, and a height within the range of 3 to 5 centimeters.

The tab 34 can be constructed of one or materials providing one or more of the following characteristics wind-resistance, moisture resistance, insulation, durability, wear-resistance, debris-resistance, flexibility, breathability, resiliency, comfort and style. Examples of materials that can be used for the garment include woven and unwoven fabrics, knits or textiles, nylon, cotton, other synthetic or natural materials, elastic materials, inelastic materials, hydrophobic materials, insulating materials, such as Neoprene, rubber, wool, cotton, leather, synthetic leather, polyester, elastane, an elastic fabric material, natural fibers, synthetic fibers, para-aramid synthetic fibers such as Kevlar®, canvas, nylon, other polymeric materials and combinations thereof. In one implementation, the tab 34 can be formed at least in part of an elastic material that would enable the tab 34 to remain relatively flat on the garment 10 when the garment is not carrying a beverage container, and then stretch or expand enough to extend over the neck 44 of a bottle 32. When the bottle 32 is removed, the tab 34 can then return to a generally flat state. In other implementations, the tab 34 can be formed of a stiffer or more rigid material that only stretches a minimal amount or not at all when a beverage container 32 is positioned beneath it.

The tab 34 is also spaced apart from the pocket 30. In one implementation, the tab 34 is positioned above the pocket 30 and above the upper edge 42 of the pocket 30. In one implementation, the tab 34 has a major dimension that extends from the first location 62 to the second location 64 in a direction that is generally parallel to the waistband 14. In another implementation, the tab 34 can extend from the first location 62 to the second location 64 in a direction that is non-parallel to the waistband 14. In another implementation, the tab 34 can extend from the first location 62 to the second location 64 in a direction that is non-parallel to the upper edge 42 of the pocket 30. In another implementation, the tab 34 can extend from the first location 62 to the second location 64 in a direction that is generally parallel to the upper edge 42 of the pocket 30.

The tab 34 is spaced apart from the upper edge 42 of the pocket 30 by a dimension d1 that is at least 0.5 centimeter. In another implementation, the tab 34 is spaced apart from the upper edge 42 of the pocket 30 by the dimension d1 of at least 1 cm. In one particular implementation, the dimension d1 is approximately 2 cm measured from the upper edge 42 at the first side edge 38 of the pocket 30 to the tab 34, and a dimension d2 is approximately 6 cm when measured from the upper edge 42 at the second side edge 40 of the pocket 30 to the tab 34. This arrangement of the tab 34 with respect to the upper edge 42 of the pocket 30 with dimension d2 being larger than d1 facilitates the ability for a user to insert the beverage container 32 into the pocket 30. In other implementations, the dimension d1 and/or dimension d2 can be 0.5 cm, 1 cm, 2 cm, 3 cm, 4 cm, 5 cm, 6 cm or greater, or other distances between these values. In other implementations, other combinations of the size of the dimension d from the upper edge 42 at top of the first and second side edges 38 and 40 can be used. In other implementations, the dimension d1 can be generally equal to d2. In other implementations, the dimension d2 can be greater than the dimension d1.

Referring to FIG. 4, the outer surface of the tab 34 can include graphical and/or alphanumeric indicia 70 indicative of designs, trademarks, graphics, specifications, certifications, instructions, warnings and/or markings. In other implementations, the indicia 70 can be applied to the pocket 30 in addition to the tab 34 in place of the tab 34.

Referring to FIGS. 5 and 8A, in one implementation, the tab 34 can be formed of a single layer 72*a* of material. The single layer 72*a* of material may also include a finish, one or more coatings and/or other treatments, such as a durable water repellant coating. Referring to FIGS. 5 and 8B, in other implementations, the tab 34 can be formed of two layers 72*a* and 72*b* of material, wherein one layer can provide one or more features and the other layer may provide one or more different features. For example, layer 72*a* can have a surface that faces the garment 10, and the surface of the layer 72*a* can be configured for engaging the twist-off cap and for facilitating the user's ability to twist off a cap from the bottle 32. In another implementation, the layer 72*b* can be formed of a durable, wear resistant material that facilitates the ability of the user to use the layer 72*b* to remove a twist-off cap from a bottle. Referring to FIGS. 5 and 8C, in other implementations, the tab 34 may be formed of at least three layers 72*a*, 72*b* and 72*c* of material. The three layers 72*a*, 72*b* and 72*c* can be formed of different materials having different properties or features. For example, layer 72*c* may be formed of an insulating material. In other implementations, the three layers 72*a*, 72*b* and 72*c* can be formed of any combination of one or more different materials having one or more different properties. In other implementations, other numbers of layers can be employed, such as four or more layers of material can be used to form the tab 34.

Figure 9:
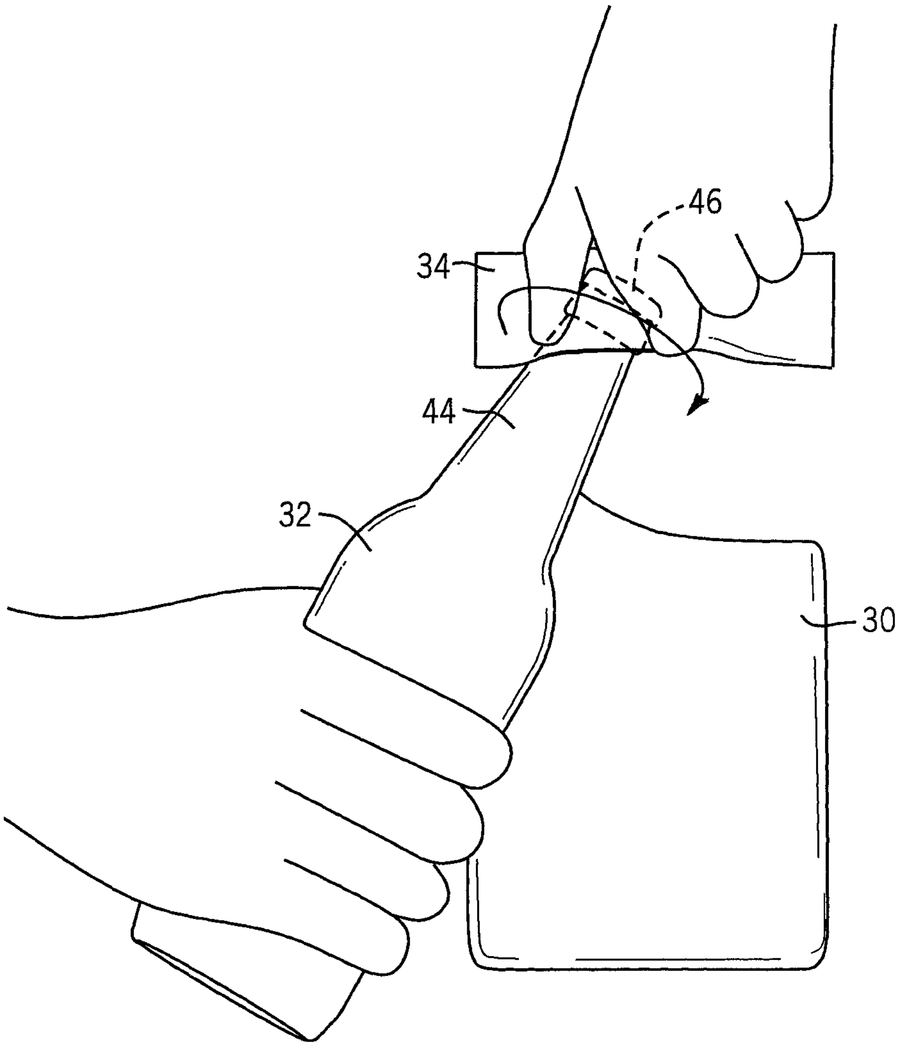
FIG. 9 is a front view of the portion of the pair of shorts of FIG. 4 illustrating a user removing a twist-off cap from a bottle using the tab.

Referring to FIGS. 4, 5 and 9, the unattached region 66 of the tab 34 is configured for facilitating the opening of the beverage container 32 by the user. FIG. 9 illustrates the beverage container as a bottle having the neck 44 and the cap 46. By simply placing the cap 46 and top of the neck 44 of bottle under the tab 34, the user can then use the unattached region 66 of the tab 34 to facilitate twisting off and removing the cap 46 from the neck 44 of the bottle 32.

As shown in FIGS. 1 and 4, the tab 34 also can be used to assist in retaining the beverage container 32 while the beverage container 32 is also within the pocket 30. When the beverage container 32 is a bottle with the neck 44. The neck can extend beneath the unattached region 66 of the tab 34 while most of the body of the bottle 32 is positioned within the pocket 30. The tab 34 and the pocket 30 securely retain the beverage container 32 and also reduce the risk of spilling the beverage from within the bottle 32. The retention of the neck 44 of the bottle 32 by the tab 34 also inhibits the bottle 32 from projecting outward to a large degree from the garment 10 and thereby reduces the risk of the neck 44 of the bottle 32 impacting an object or another person when the user is moving about with the bottle 32 (opened or unopened) within the pocket 30.

Figure 11:
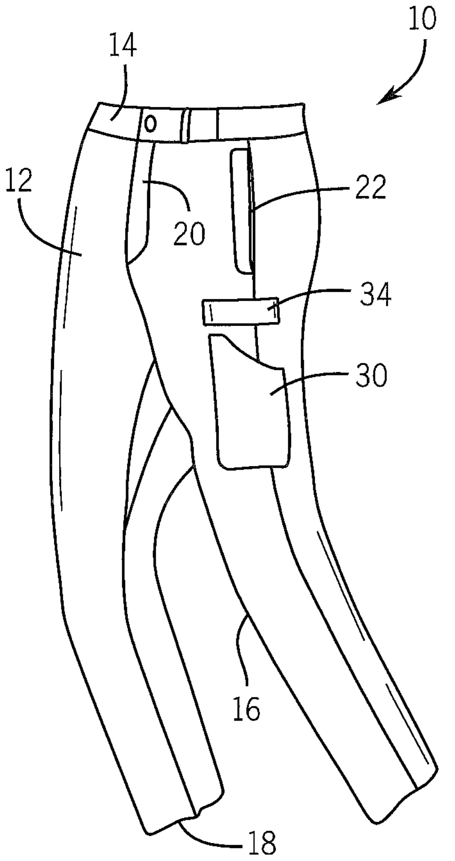
FIG. 11 is a front side view of the pair of pants of FIG. 10 shown without the beverage container.
Figure 12:
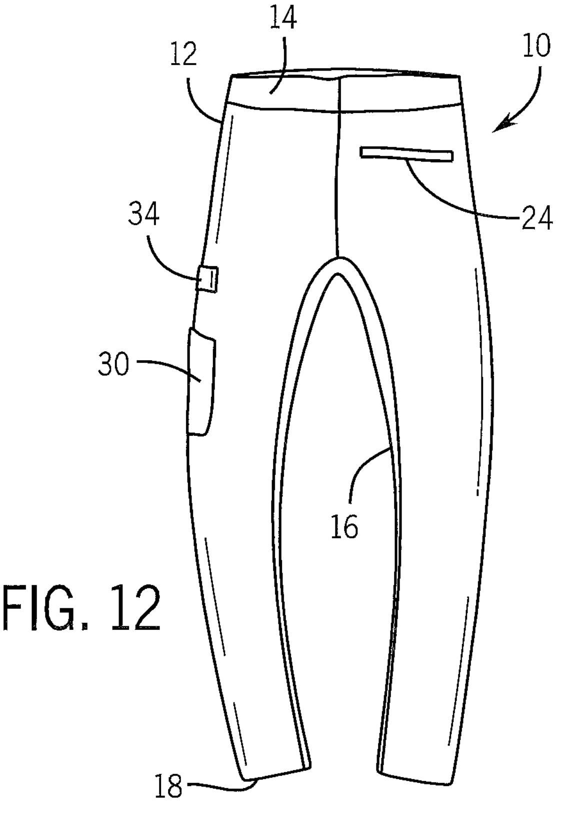
FIG. 12 is a rear view of the pair of pants of FIG. 10 shown without the beverage container.

Referring to FIGS. 10 through 12, in other implementations, the garment 10 can be a pair of pants. The detailed description above is also directly applicable to a pair of pants.

Figure 13:
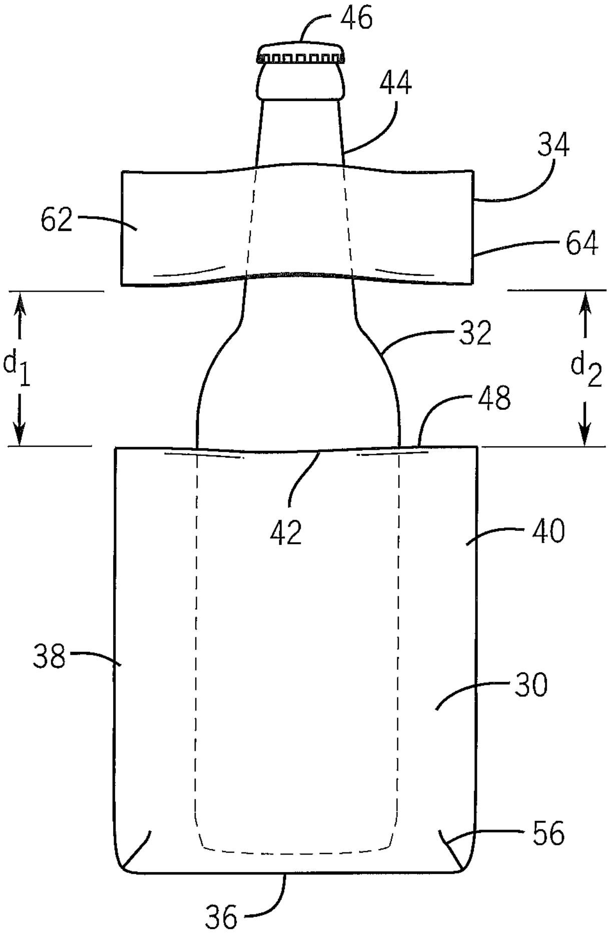
FIG. 13 is a front view of a region of a garment including a pocket and a tab carrying a beverage container in accordance with an alternative implementation of the present invention.
Figure 14:
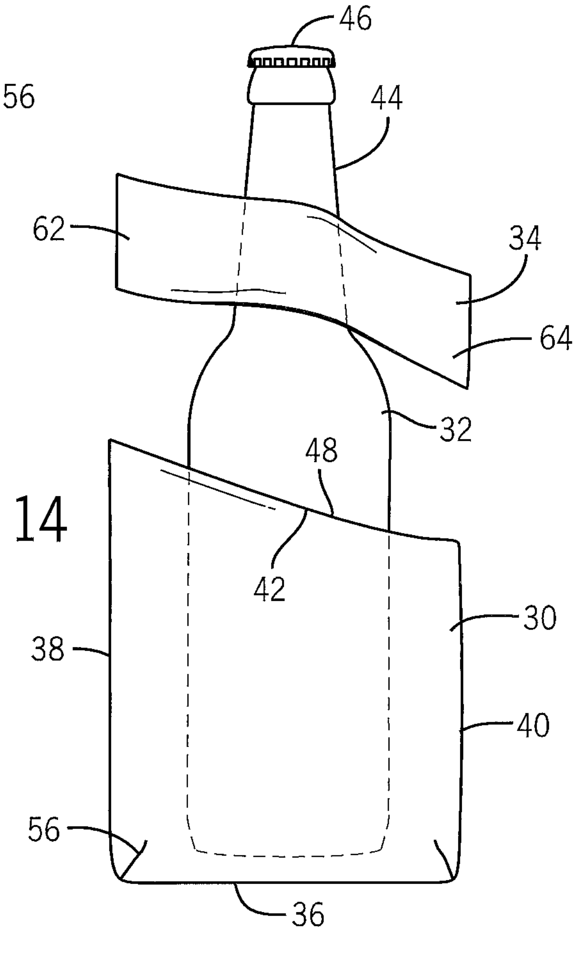
FIG. 14 is a front view of a region of a garment including a pocket and a tab carrying a beverage container in accordance with another alternative implementation of the present invention.

Referring to FIGS. 13 and 14, the orientation and size of the pocket 30 and/or the tab 34 can vary. FIG. 13 illustrates one example orientation in which the major dimension of the tab 34 extends from the first location to the second location in a direction that is substantially parallel to the waistband 14, and also is substantially parallel to the upper edge 42 of the pocket 30. The first and second side edges 38 and 40 of the pocket 30 have the same length resulting in the upper edge 42 extending linearly between the first and second side edges 38 and 40 in a direction that is substantially parallel to the major dimension of the tab 34 and to the waistband 14. The dimensions d1 and d2 are also substantially equal. Referring to FIG. 14, the major dimension of the tab 34 extends in a direction that is non-parallel to the waistband 14 of the garment 10. Additionally, the top edge 42 of the pocket 30 is also shown extending in a direction that is non-parallel to the waistband 14. In the implementation of FIG. 14, the top edge 42 of the pocket 30, although non-parallel to the waistband 14, is substantially parallel to the major dimension of the tab 34. The top edge 42 also extends linearly from the first side edge 38 to the second side edge 40 of the pocket 30.

Referring to FIGS. 15 and 17, in one implementation, the tab 34 can further include a bottle opening element 80. The bottle opening element 80 can include an aperture 82 for receiving a portion of a non-twist off cap 84 of a bottle 86 and for facilitating the engagement of the bottle opening element 80 with the cap 84 and the bottle 86 during opening of the bottle 86. The bottle opening element 80 is preferably formed of a rigid material such as an alloy. In other implementations, the bottle opening element 80 can be formed of other rigid materials, such as, a plastic, a fiber-composite material, aluminum, wood, ceramic, a polymeric material, and/or combinations thereof. As shown in FIG. 15, the bottle opening element 80 can be positioned on an outer surface 88 of the tab 34 such that the bottle opening element 80 is visible when viewing the garment 10 from a distance. The bottle opening element 80 is also shown in a central position on the tab 34. In other implementations, the bottle opening element can be positioned in other locations about the tab 34, such as adjacent to one of the first or second locations. The tab 34 of the implementation of FIG. 15 can be formed of a more rigid and less stretchable material so that it facilitates the use of the bottle opening element 80 in opening of the bottle. FIG. 17 illustrates a user opening the bottle 86 with the non-twist off cap 84 using the bottle opening element 80 of the tab 34.

Referring to FIG. 16, in another implementation, the bottle opening element 80 can be positioned on a back side 90 of the tab 34 such that the bottle opening element 80 faces the garment 10 and is not visible from a distance without twisting or bending over the tab 34. The bottle opening element 80 is shown adjacent to the first location. In other implementations, the bottle opening element 80 can be positioned at other locations about the back side of the tab 34.

Figure 18:
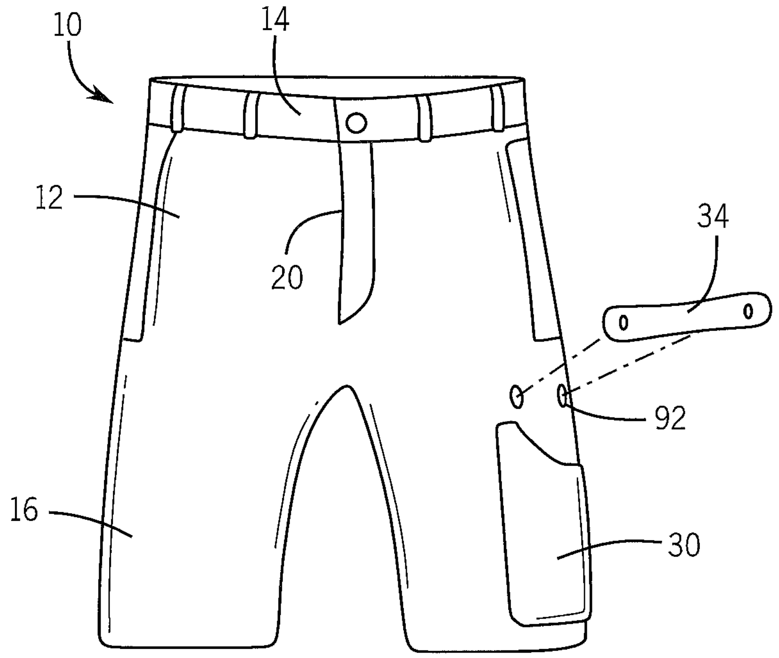
FIG. 18 is a front view of a garment having a removable tab in accordance with another alternative implementation of the present invention.

Referring to FIG. 18, in another implementation, the tab 34 can be removably coupled to the garment 10 such as through a pair of buttons 92. In other implementations, other fasteners can be used such as snaps, hook and loop fasteners, zippers, and combinations thereof.

Although the present disclosure has been described with reference to example implementations, workers skilled in the art will recognize that changes may be made in form and detail without departing from the spirit and scope of the claimed subject matter. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure. Accordingly, it will be intended to include all such alternatives, modifications and variations set forth within the spirit and scope of the appended claims. Unless a term is specifically and overtly defined in this specification, the terminology used in the present specification is intended to be interpreted in its broadest reasonable manner, even though may be used conjunction with the description of certain specific embodiments of the present invention.

What is claimed is:

1. A garment for use on a lower body of a user and configured for retaining a beverage container, the beverage container being a bottle having a neck region and a twist-off cap, the garment comprising:

a waist band;

only one beverage pocket coupled to the garment, the pocket including a lower closed edge, first and second closed side edges and an open upper edge having a first length extending from the first closed side edge to the second closed side edge, the open upper edge having first and second ends adjacent the first and second closed side edges, respectively, the pocket sized to removably receive and retain the beverage container; and only one beverage holding tab coupled to the garment at first and second locations, the tab having a second length that is not greater than the first length, the first and second locations being spaced apart from each other to define an unattached region of the tab between the first and second locations, the unattached region configured for facilitating the opening of the beverage container by the user, the tab being positioned above the open upper edge of the pocket such that the tab is fully spaced apart from the pocket by at least a first dimension and such that the tab does not overlap the beverage pocket, the first location of the tab being spaced from the from the upper edge of the pocket by the first dimension, and the second location of the tab being spaced apart from the upper edge of the pocket by at least a second dimension, wherein the second dimension is greater than the first dimension, the second end of the open upper edge being positioned further from the waistband than the first end of the open upper edge, wherein the tab includes an outer surface, a back side and a bottle opener, and wherein the bottle opener is positioned on the outer surface of the tab such that it is visible from a distance when viewing the garment, and accessible for use without having to use the back side of the tab to open the beverage container.

2. A garment for use on a lower body of a user and configured for retaining a beverage container, the beverage container being a bottle having a neck region and a twist-off cap, the garment comprising:

a waist band;

only one beverage pocket coupled to the garment, the pocket including a lower closed edge, first and second closed side edges and an open upper edge having a first length extending from the first closed side edge to the second closed side edge, the open upper edge having first and second ends adjacent the first and second closed side edges, respectively, the pocket sized to removably receive and retain the beverage container; and only one beverage holding tab coupled to the garment at first and second locations, the tab having a second length that is not greater than the first length, the first and second locations being spaced apart from each other to define an unattached region of the tab between the first and second locations, the unattached region configured for facilitating the opening of the beverage container by the user, the tab being positioned above the open upper edge of the pocket such that the tab is fully spaced apart from the pocket by at least a first dimension and such that the tab does not overlap the beverage pocket, the first location of the tab being spaced from the from the upper edge of the pocket by the first dimension, and the second location of the tab being spaced apart from the upper edge of the pocket by at least a second dimension, wherein the second dimension is greater than the first dimension, the second end of the open upper edge being positioned further from the waistband than the first end of the open upper edge, wherein the tab includes an outer surface, a back side and a bottle opener, and wherein the bottle opener is positioned on the back side of the tab such that it is not visible from a distance without twisting or bending over the tab.

3. A garment for use on a lower body of a user and configured for retaining a beverage container, the beverage container being a bottle having a neck region and a twist-off cap, the garment comprising:

a waist band;

only one beverage pocket coupled to the garment, the pocket including a lower closed edge, first and second closed side edges and an open upper edge having a first length extending from the first closed side edge to the second closed side edge, the open upper edge having first and second ends adjacent the first and second closed side edges, respectively, the pocket sized to removably receive and retain the beverage container; and only one beverage holding tab coupled to the garment at first and second locations, the tab having a second length that is not greater than the first length, the first and second locations being spaced apart from each other to define an unattached region of the tab between the first and second locations, the unattached region configured for facilitating the opening of the beverage container by the user, the tab being positioned above the open upper edge of the pocket such that the tab is fully spaced apart from the pocket by at least a first dimension and such that the tab does not overlap the beverage pocket, the first location of the tab being spaced from the from the upper edge of the pocket by the first dimension, and the second location of the tab being spaced apart from the upper edge of the pocket by at least a second dimension, wherein the second dimension is greater than the first dimension, the second end of the open upper edge being positioned further from the waistband than the first end of the open upper edge, wherein the open upper edge of the pocket has a linear portion and a curved portion.

* * * * *